United States Patent
Dimitrovski et al.

(10) Patent No.: US 12,317,341 B2
(45) Date of Patent: *May 27, 2025

(54) METHOD OF, AND SYSTEMS FOR, ESTABLISHING A CONNECTION BETWEEN A REMOTE USER EQUIPMENT, UE, AND A TELECOMMUNICATION NETWORK VIA A RELAY CAPABLE UE

(71) Applicants: Koninklijke KPN N.V., Rotterdam (NL); Nederlandse Organisatie voor Toegepast-Natuurwetenschappelijk Onderzoek TNO, The Hague (NL)

(72) Inventors: Toni Dimitrovski, The Hague (NL); Antonius Norp, The Hague (NL); Miodrag Djurica, Rotterdam (NL)

(73) Assignees: Koninklijke KPN N.V., Rotterdam (NL); Nederlandse Organisatie voor Toegepast-Natuurwetenschappelijk Onderzoek TNO, s-Gravenhage (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/355,878

(22) Filed: Jun. 23, 2021

(65) Prior Publication Data

US 2021/0321471 A1    Oct. 14, 2021

Related U.S. Application Data

(63) Continuation of application No. 16/347,447, filed as application No. PCT/EP2017/078308 on Nov. 6, 2017, now Pat. No. 11,076,435.

(30) Foreign Application Priority Data

Nov. 7, 2016    (EP) .................................... 16197546

(51) Int. Cl.
*H04W 76/14*    (2018.01)
*H04W 8/08*    (2009.01)
(Continued)

(52) U.S. Cl.
CPC ............. *H04W 76/14* (2018.02); *H04W 8/08* (2013.01); *H04W 76/15* (2018.02); *H04W 76/30* (2018.02); *H04W 88/04* (2013.01); *H04W 92/18* (2013.01)

(58) Field of Classification Search
CPC ....... H04W 76/14; H04W 8/08; H04W 76/15; H04W 76/30; H04W 88/04; H04W 92/18; H04W 76/12
See application file for complete search history.

(56) References Cited

U.S. PATENT DOCUMENTS 11,076,435 B2 *   7/2021   Dimitrovski .......... H04W 92/18
2016/0360563 A1   12/2016   Lecroart et al.
(Continued)

FOREIGN PATENT DOCUMENTS

WO    2015/125479 A1    8/2015
WO    2016/073984 A2    5/2016
(Continued)

OTHER PUBLICATIONS

3GPP TSG-RAN WG2 Meeting #96, "Connection establishment for UE-to-NW relaying," Nokia, Alcatel-Lucent Shanghai Bell, R2-168403, Reno, USA, Nov. 14-18, 2016.
(Continued)

*Primary Examiner* — Donald L Mills
(74) *Attorney, Agent, or Firm* — McDonnell Boehnen Hulbert & Berghoff LLP

(57) ABSTRACT

A method of establishing a connection between a remote User Equipment, UE, and a telecommunication network via a relay capable UE, wherein said telecommunication net-
(Continued)

work comprises a core network and an access network, and wherein said connection is established using a Remote Radio Access Bearer between the remote UE, via a relay capable UE, via an access node in the access network, and the core network.

19 Claims, 6 Drawing Sheets

(51) Int. Cl.
    *H04W 76/15*    (2018.01)
    *H04W 76/30*    (2018.01)
    *H04W 88/04*    (2009.01)
    *H04W 92/18*    (2009.01)

(56) References Cited

U.S. PATENT DOCUMENTS

| | | | |
|---|---|---|---|
| 2018/0092150 A1 | 3/2018 | Tenny et al. | |
| 2018/0124633 A1 | 5/2018 | Hwang et al. | |
| 2019/0028962 A1* | 1/2019 | Chun | H04W 48/02 |
| 2019/0053301 A1 | 2/2019 | Hampel et al. | |
| 2019/0182747 A1* | 6/2019 | Chun | H04W 76/18 |
| 2019/0215762 A1* | 7/2019 | Kim | H04W 8/005 |
| 2019/0230723 A1 | 7/2019 | Kim et al. | |
| 2019/0239132 A1 | 8/2019 | Wallentin et al. | |
| 2019/0380120 A1 | 12/2019 | Nair | |
| 2019/0394816 A1* | 12/2019 | Kim | H04W 76/10 |
| 2020/0059980 A1* | 2/2020 | Hong | H04W 8/005 |
| 2020/0068380 A1* | 2/2020 | Wallentin | H04W 76/14 |
| 2020/0120728 A1 | 4/2020 | Wallentin et al. | |
| 2020/0196369 A1* | 6/2020 | Tenny | H04W 4/80 |

FOREIGN PATENT DOCUMENTS

| | | |
|---|---|---|
| WO | 2016/073984 A3 | 5/2016 |
| WO | 2016/163430 A1 | 10/2016 |
| WO | 2016162722 A1 | 10/2016 |

OTHER PUBLICATIONS

3GPP TSG-RAN WG2 Meeting #95, "Considerations on the evolved UE-to-Network Relay scenario and architecture," ZTE, R2-165254, Goteborg, Sweden, Aug. 22-26, 2016.

PCT International Search Report and Written Opinion, PCT International Application No. PCT/EP2017/078308, dated Feb. 8, 2018, 15 pages.

NEC: "L2 Prose UE-to-Network Relay Alternative", 3GPP Draft; S2-133366, 3rd Generation Partnership Project (3GPP), vol. SA WG2, Sep. 18, 2013, pp. 1-8.

European Search Report, European Patent Application No. 16197546.1, Apr. 26, 2017, 4 pages.

3GPP TS 23.303 V13.5.0, "3rd Generation Partnership Project; Technical Specification Group Services and System Aspects; Proximity-Based Services (ProSe); Stage 2 (Release 13)", Sep. 2016, pp. 1-124.

3GPP TSG-RAN WG2 Meeting #96, "Discussion on connection establishment and bearer setup," ZTE, R2-168139, Reno, USA, Nov. 14-18, 2016.

3GPP TSG-RAN WG2 Meeting #89bis, "Protocol Stack for UE-to-Network Relay," Huawei, HiSilicon, R2-151326, Bratislava, Slovakia, Apr. 20-24, 2015.

3GPP TS 23.303 V14.0.0, "3rd Generation Partnership Project; Technical Specification Group Services and System Aspects; Proximity-Based Services (ProSe); Stage 2 (Release 14)", Sep. 2016, pp. 1-124.

3GPP TSG-RAN WG2 Meeting #90, "Signalling considerations on eNB authorization of remote UE for UE-to-Network relay," Intel Corporation, R2-152258, Fukuoka, Japan May 25-29, 2015.

* cited by examiner

METHOD OF, AND SYSTEMS FOR, ESTABLISHING A CONNECTION BETWEEN A REMOTE USER EQUIPMENT, UE, AND A TELECOMMUNICATION NETWORK VIA A RELAY CAPABLE UE

CROSS REFERENCE TO RELATED APPLICATIONS

The present application is a continuation of, and claims priority to, U.S. application Ser. No. 16/347,447, filed May 3, 2019, which is a national stage entry of, and claims priority to, PCT/EP2017/078308, filed on Nov. 6, 2017, which claims priority to European Patent Application EP 16197546.1, filed in the European Patent Office on Nov. 7, 2016, all three of which preceding applications are hereby incorporated in their entirety herein by reference.

TECHNICAL FIELD

The present invention is generally related to User Equipments, UEs, that are connected to a telecommunication network via a relay capable UE. More specifically, the invention relates to a method of establishing a connection between a remote UE and the telecommunication network via a relay capable UE.

BACKGROUND

Telecommunication networks enable User Equipments, UEs, to communicate with each other via one of a number of access nodes and via one or more core networks. Typically, the UE's are mobile terminals designed to be used by human users, such as mobile smart phones, tablets, Virtual Reality, VR, headsets, or anything alike. The term UE may also refer to equipment designed to be used in a Machine-to-Machine or Internet of Things context, such as devices, wearables, sensors, actuators, cameras, cars, media devices, or anything alike. The term UE may also refer to generally stationary communication devices, such as fixed phones, computers, or stationary Internet of Things, IOT, devices, smart meters or anything alike. In the following description the term User Equipment is used, which is intended to cover any of the above identified use cases.

In the context of the present disclosure, a telecommunication network comprises the access network, for example the evolved UMTS Terrestrial Radio Access, E-UTRAN, access network as well as the core network, for example the Evolved Packet Core, EPC, network. The access node is typically the node in the access network to which a UE directly communicates, for example the Evolved Node B, the radio base station or anything alike.

The last couple of years, proximity-based services, ProSe, have been introduced in the telecommunication network for providing additional functionality for a UE. The features of ProSe include ProSe discovery and ProSe Direct Communication.

A ProSe capable UE may perform a ProSe discovery to identify ProSe-enabled UEs in its proximity. Direct Communication enables the establishment of a direct communication connection between ProSe-enabled UEs that are in direct communication range. The ProSe Direct Communication path could use different radio technologies, for example, E-UTRAN or Wireless Local Area Network, WLAN, or anything alike.

ProSe Direct communication also facilitates the use of a ProSe UE-to-Network relay, which acts as a relay between the access network and a remote UE. The ProSe UE-to-Network relay entity thus provides the functionality to support connectivity to the telecommunication network for remote UE's. A UE is considered to be a remote UE for a certain ProSe UE-to-Network relay if it has successfully established a direct communication path to the UE-to-Network relay. A remote UE can be located within, or outside, the coverage area of the access node.

The ProSe UE-to-Network Relay relays unicast traffic, uplink as well as downlink, between the Remote UE and the telecommunication network. The ProSe UE-to-Network Relay provides generic functions that can relay any Internet Protocol, IP, traffic. Here, ProSe Direct Communication is used between Remote UEs and the ProSe UE-to-Network Relays for the unicast traffic.

One of the drawbacks of the above identified known methods of relaying traffic by the UE-to-Network relay is that the network is not able to determine whether traffic is related to the UE-to-Network Relay or related to the remote UE using the UE-to-Network Relay for its connection to the telecommunication network.

SUMMARY

It is an objective to provide for methods of establishing a connection between a remote User Equipment, UE, and a telecommunication network via a relay capable UE.

It is another objective to provide for systems for supporting establishment of a connection between a remote User Equipment, UE, and a telecommunication network via a relay capable UE.

In a first aspect, there is provided a method of establishing a connection between a remote User Equipment, UE, and a telecommunication network via a relay capable UE, wherein said telecommunication network comprises a core network and an access network, said access network comprising an access node, wherein said relay capable UE has an established Radio Access Bearer between said relay capable UE and said core network wherein said established Radio Access Bearer comprises:

a first UE-to-access node bearer between said relay capable UE and said access node, and an access node-to-core network bearer between said access node and said core network;

said method comprising the steps of:

receiving a Request Relay message, from said relay capable UE, wherein said Request Relay message comprises a request, originating from said remote UE, for using said relay capable UE as a relay to the core network, wherein said request is associated with establishment of a Remote Radio Access Bearer, wherein said Remote Radio Access Bearer comprises:

a UE-to-UE bearer between said remote UE and said relay capable UE;

a second UE-to-access node bearer between said relay capable UE and said access node, wherein said second UE-to-access node bearer is different from said first UE-to-access node bearer, and an access node-to-core network bearer between said access node and said core network;

sending to said relay capable UE, a command for establishing at least said UE-to-UE bearer.

Preferably, said command is also directed to the establishment of the second UE-to-access node bearer.

According to the presented method, the access node is able to distinguish between traffic associated with said relay capable UE via said Radio Access Bearer and traffic associated with said remote UE over said Remote Radio Access Bearer. That is, the traffic from the remote UE and the traffic from the relay capable UE are carried over different connections.

One of the advantages of the presented method for the access node is that the access node is able to use conventional mobility management procedures for, e.g., performing handovers. Another advantage is that the Remote Radio Access Bearer may have its own encryption and security context. For the remote UE, it will look like a conventional security context. The telecommunication network may see two different security contexts, one for the remote UE and one for the relay capable UE.

Another advantage of the above is that the access node as well as the core network have separate representations for the remote UE and the relay capable UE, respectively, as well as their state. This means that there is a separate connection for each of the UEs, i.e. the remote UE and the relay capable UE, to the telecommunication network. As such, the relaying is performed in such a way that the access node and the core network are able to distinguish the traffic associated with the relay capable UE from the traffic associated with the remote UE, and are able to manage the connections thereof separately. This includes, for example, standard mobility and session management procedures.

One of the advantages of the presented method for the core network is that the core network can perform Quality-of-Service, QoS, control and charging for each of the UE's separately.

According to the present disclosure, said remote UE is directly made visible to the access node by introducing the second UE-to-access node bearer, which is established between the relay capable UE and the access node. The relay capable UE may thus act as a relay of signalling and user plane traffic between the remote UE and the radio access network, i.e. the access node.

It is noted that, typically, each of the nodes involved in the establishing process may store information required to forward traffic in both directions. This information may, for example, be an identification of the UE-to-UE bearer, the second UE-to-access node bearer, the access node-to-core network bearer and/or an identification of the remote UE and the relay capable UE.

The Remote Radio Access Bearer between the remote UE, i.e. the first end point, and the core network, i.e. the second end point, actually comprises three bearers associated to each other. These three bearers constitute the UE-to-UE bearer established between the remote UE and the relay capable UE, the second UE-to-access node bearer established between the relay capable UE and the access node, and finally the access node-to-core network bearer established between the access node and the core network. Identifications of these three bearers in relation to the Remote Radio Access Bearer may be stored in intermediate nodes in order for the intermediate nodes to be able to associate these three bearers with the Remote Radio Access Bearer. For example, the relay capable UE may store identifications of the UE-to-UE bearer as well as the second UE-to-access node bearer. The access node may store identifications of the second UE-to-access node bearer as well as the access node-to-core network bearer.

In an embodiment, the Request Relay message comprises an identifier for identifying said remote UE at the access node, wherein said method further comprises the steps of:
  determining that said remote UE already has an established non-relayed connection with said access node based on said identifier, and
  sending a command for releasing said established non-relayed connection once an acknowledgement message has been received.

The above described embodiment is directed to the scenario that the remote UE, initially, has a direct, i.e. non-relayed connection to the core network. That is, the remote UE may be connected to the core network in a conventional manner by, for example, an established Radio Access Bearer between itself and the core network.

After a while, the remote UE may decide that it would be beneficial to have a relayed connection to the core network. Such a decision may, for example, be based on a non-reliable non-relayed connection, or the desire to save battery power by using a nearby device as relay. As such, using a relayed connection, the remote UE may be connected to the core network in a more stable, reliable and more battery power efficient manner.

In order to discover a relay capable UE, the remote UE may perform a ProSe discovery method as described in, for example, TS 23.303, chapter 5.3 ProSe Direct Discovery. The result of such a discovery method is finding a relay capable UE that may act as a relay for the remote UE towards the telecommunication network.

In accordance with the above described embodiment, the same access node is used for both the connection of the relay capable UE to the network and the direct, i.e. non-relayed, connection of the remote UE to the network. As such, it is preferred that a non-relayed connection to the core network of the remote UE is already established via that same access node. To determine whether the non-relayed connection of the remote UE to the core network is established via the access node, an identifier may be provided in the Request Relay message for identifying the remote UE at the access node. The identifier is, for example, a Cell Radio Network Temporary Identifier, or other similar identifier that identifies the UE at the access node. The access node may thus be able to determine whether it already has a connection to the remote UE using the identifier in the Request Relay message.

Finally, once the bearers for the Remote Radio Access Bearer have been established between the remote UE and the relay capable UE, between the relay capable UE and the access node, and between the access node and the core network, the non-relayed connection between the remote UE and the core network may be released, i.e. the underlying bearers for the RAB may be released. This action may be performed upon receipt of an acknowledgement message from the relay capable UE indicating that the requested bearers between the remote UE and the relay capable UE and between the relay capable UE and the access node are established and/or upon receipt of an acknowledgement message from the core network that a new access node to core network node bearer has been established, or upon receipt of both acknowledgement messages. It might also be possible that one of the bearers of the RAB is re-used and not released.

Following the above, initially, a Radio Access Bearer was established between the remote UE and the core network. This Radio Access Bearer comprised a UE-to-access node bearer and an access node-to-core network bearer. This Radio Access Bearer becomes the Remote Radio Access Bearer once the decision has been made, for example by the remote UE, to start relaying via the relay capable UE. In this particular case a new UE-to-UE bearer, i.e. between the remote UE and the relay capable UE may be added to the already existing Radio Access Bearer, and a new UE-to-access node bearer, i.e. between the relay capable UE and the access node, may be established. These different bearers may all be associated with the Remote Radio Access Bearer that does not change its identification. The core network does not necessarily need to know that anything has changed, it may still see the same Radio Access Bearer. So, the nodes in the core network would not necessarily see the difference between the original Radio Access Bearer and the Remote Radio Access Bearer.

The above described embodiment is, for example, an embodiment directed to a remote UE being in EPS Connection Management, ECM, connected mode.

In a further embodiment, the step of receiving the Request Relay message further comprises:
  receiving from said relay capable UE initiated by said remote UE, a service request message for requesting services from said telecommunication network,
  forwarding said service request message to a Mobility Management network function, comprised by said telecommunication network,
  receiving from said Mobility Management network function, an accept message indicating approval for said requested services by said remote UE.

This above described embodiment is directed, for example, to the situation in which the remote UE is in ECM-idle mode. In this particular case, a service request, for example a Non-Access Stratum, NAS, service request, is received for requesting services from the telecommunication network. The request is forwarded to a Mobility Management network function, for example a Mobility Management Entity, MME, comprised by the telecommunication network. Typically, a Mobility Management Entity sends an initial Context Setup Request to the access node in reply to the received service request.

The advantage of the above described embodiment is that the remote UE can be connected to the telecommunication network via the relay capable UE, even in the situation when the remote UE does not have a separate, non-relayed connection established to the telecommunication network. From the perspective of the core network, the remote UE may be connected in the same way as a UE that is connected directly, i.e. non-relayed.

In a further embodiment, the method comprises the step of:
  receiving an acknowledgement message, from said relay capable UE, wherein said acknowledgement message comprises an indication that said UE-to-UE bearer has been established.

Preferably, said acknowledgement message comprises an indication that said second UE-to-access node bearer has also been established.

The advantage of this embodiment is that the access node is made aware of the fact that the UE-to-UE bearer and the second UE-to-access node bearer have been established.

In yet another embodiment, the access node is a base station in a cellular network, for example an evolved node B, eNB.

The expressions, i.e. the wording, of the different aspects comprised by the method and devices according to the present disclosure should not be taken literally. The wording of the aspects is merely chosen to accurately express the rationale behind the actual functioning of the aspects.

In accordance with the present disclosure, different aspects applicable to the above mentioned examples of the methods in a first aspect of the invention, including the advantages thereof, correspond to the aspects which are applicable to methods of the second aspect or the third aspect of the invention.

In a second aspect of the invention, there is provided a method of establishing a connection between a remote User Equipment, UE, and a telecommunication network via a relay capable UE, wherein said telecommunication network comprises a core network and an access network, said access network comprising an access node, wherein said relay capable UE has an established Radio Access Bearer between said relay capable UE and said core network, wherein said established Radio Access Bearer comprises:
  a first UE-to-access node bearer between said relay capable UE and said access node;
  an access node-to-core network bearer between said access node and said core network;
  said method comprising the steps of:
  receiving a Request Relay message, from said remote UE, wherein said Request Relay message comprises a request, from said remote UE, for using said relay capable UE as a relay to the core network, wherein said request is associated with establishment of a Remote Radio Access Bearer, wherein said Remote Radio Access Bearer comprises:
  a UE-to-UE bearer between said remote UE and said relay capable UE;
  a second UE-to-access node bearer between said relay capable UE and said access node, wherein said second UE-to-access node bearer is different from said first UE-to-access node bearer, and
  an access node-to-core network bearer between said access node and said core network;
  sending said Request Relay message to said access node, and
  receiving from said access node, a command for establishing at least said UE-to-UE bearer.

Preferably, said command is also directed to the establishment of the second UE-to-access node bearer.

In an embodiment, the method further comprises the step of:
  sending an acknowledgement message, to said access node wherein said acknowledgement message comprises an indication that said UE-to-UE bearer has been established.

Preferably, said acknowledgement message comprises an indication that said second access node-to-core network bearer has also been established.

In a third aspect, the invention provides for a method of establishing a connection between a remote User Equipment, UE, and a telecommunication network via a relay capable UE, wherein said telecommunication network comprises a core network and an access network, said access network comprising an access node, wherein said relay capable UE has an established Radio Access Bearer between said relay capable UE and said core network, wherein said established Radio Access Bearer comprises:
  a first UE-to-access node bearer between said relay capable UE and said access node, and
  an access node-to-core network bearer between said access node and said core network;
  said method comprising the steps of:
  sending to said relay capable UE, a Request Relay message, wherein said Request Relay message comprises a request for using said relay capable UE as a relay to the core network, wherein said request is associated with establishment of a Remote Radio Access Bearer, wherein said Remote Radio Access Bearer comprises:
  a UE-to-UE bearer between said remote UE and said relay capable UE;

a second UE-to-access node bearer between said relay capable UE and said access node, wherein said second UE-to-access node bearer is different from said first UE-to-access node bearer, and an access node-to-core network bearer between said access node and said core network;

establishing a corresponding UE-to-UE signalling connection, and transporting Non-Access Stratum, NAS, signalling between said remote UE and said core network over said UE-to-UE signalling connection.

In an embodiment, the method further comprises the steps of:

receiving a command for releasing a direct, non-relayed connection between said remote UE and said telecommunication network via said access node, and releasing said direct, non-relayed connection in response to said received command.

In another embodiment, the method further comprises the step of:

performing a discovery process for discovering UE's in a proximity of said remote UE, wherein said relay capable UE is one of said discovered UE's.

In a fourth aspect, the invention provides for a non-transitory computer-readable storage medium, comprising instructions which, when executed on at least one processor, cause the at least one processor to carry out the method according to any of the embodiments as described above.

Any type of computer readable storage medium may be utilized. The computer readable storage medium may be, for example, but not limited to, an electronic, magnetic, optical, electromagnetic, infrared, or semiconductor system, apparatus, or device, or any suitable combination of the foregoing. More specific examples of the computer readable storage medium would include the following: an electrical connection having one or more wires, a portable computer diskette, a hard disk, a random access memory, RAM, a read-only memory, ROM, an erasable programmable read-only memory, a portable compact disc read-only memory, an optical storage device, a magnetic storage device, or any suitable combination of the foregoing.

In a fifth aspect, the invention provides for an access node arranged for establishing a connection between a remote User Equipment, UE, and a telecommunication network via a relay capable UE, wherein said telecommunication network comprises a core network and an access network, said access network comprising an access node, wherein said relay capable UE has an established Radio Access Bearer between said relay capable UE and said core network wherein said established Radio Access Bearer comprises:

a first UE-to-access node bearer between said relay capable UE and said access node, and an access node-to-core network bearer between said access node and said core network;

said access node comprising:

a receiver arranged for receiving a Request Relay message, from said relay capable UE, wherein said Request Relay message comprises a request, originating from said remote UE, for using said relay capable UE as a relay to the core network, wherein said request is associated with establishment of a Remote Radio Access Bearer, wherein said Remote Radio Access Bearer comprises:

a UE-to-UE bearer between said remote UE and said relay capable UE;

a second UE-to-access node bearer between said relay capable UE and said access node, wherein said second UE-to-access node bearer is different from said first UE-to-access node bearer, and an access node-to-core network bearer between said access node and said core network;

a transmitter arranged for sending to said relay capable UE, a command for establishing at least said UE-to-UE bearer.

In a sixth aspect, the invention provides for a relay capable User Equipment, UE, arranged for establishing a connection between a remote User Equipment, UE, and a telecommunication network via a relay capable UE, wherein said telecommunication network comprises a core network and an access network, said access network comprising an access node, wherein said relay capable UE has an established Radio Access Bearer between said relay capable UE and said core network, wherein said established Radio Access Bearer comprises:

a first UE-to-access node bearer between said relay capable UE and said access node;

an access node-to-core network bearer between said access node and said core network;

said relay capable UE comprising:

a receiver arranged for receiving a Request Relay message, from said remote UE, wherein said Request Relay message comprises a request for using said relay capable UE as a relay to the core network, wherein said request is associated with establishment of a Remote Radio Access Bearer, wherein said Remote Radio Access Bearer comprises:

a UE-to-UE bearer between said remote UE and said relay capable UE;

a second UE-to-access node bearer between said relay capable UE and said access node, wherein said second UE-to-access node bearer is different from said first UE-to-access node bearer, and an access node-to-core network bearer between said access node and said core network;

a transmitter arranged for sending said Request Relay message to said access node, and wherein said receiver is further arranged for receiving from said access node, a command for establishing at least said UE-to-UE bearer.

In a seventh aspect, there is provided a remote User Equipment, UE, arranged for establishing a connection between a remote User Equipment, UE, and a telecommunication network via a relay capable UE, wherein said telecommunication network comprises a core network and an access network, said access network comprising an access node, wherein said relay capable UE has an established Radio Access Bearer between said relay capable UE and said core network, wherein said established Radio Access Bearer comprises:

a first UE-to-access node bearer between said relay capable UE and said access node, and an access node-to-core network bearer between said access node and said core network;

said remote UE comprising:

a transmitter arranged for sending to said relay capable UE, a Request Relay message, wherein said Request Relay message comprises a request for using said relay capable UE as a relay to the core network, wherein said request is associated with establishment of a Remote Radio Access Bearer, wherein said Remote Radio Access Bearer comprises:

a UE-to-UE bearer between said remote UE and said relay capable UE;

a second UE-to-access node bearer between said relay capable UE and said access node, wherein said second UE-to-access node bearer is different from said first UE-to-access node bearer, and an access node-to-core network bearer between said access node and said core network;

a processor arranged for establishing a corresponding UE-to-UE signalling connection and for transporting Non-Access Stratum, NAS, signalling between said remote UE and said core network over said UE-to-UE signalling connection.

The advantage of having a Non-Access Stratum, NAS, signalling connection is that via the NAS signalling connection, the remote UE can send any signalling messages to any core network node, e.g. an Mobility Management Entity, MME, that a directly connected UE would also be able to send. This reduces the impact of relaying on the behaviour of the remote UE in order to deal with relaying.

The above-mentioned and other features and advantages of the disclosure will be best understood from the following description referring to the attached drawings. In the drawings, like reference numerals denote identical parts or parts performing an identical or comparable function or operation.

DETAILED DESCRIPTION OF THE DRAWINGS

Figure 1:
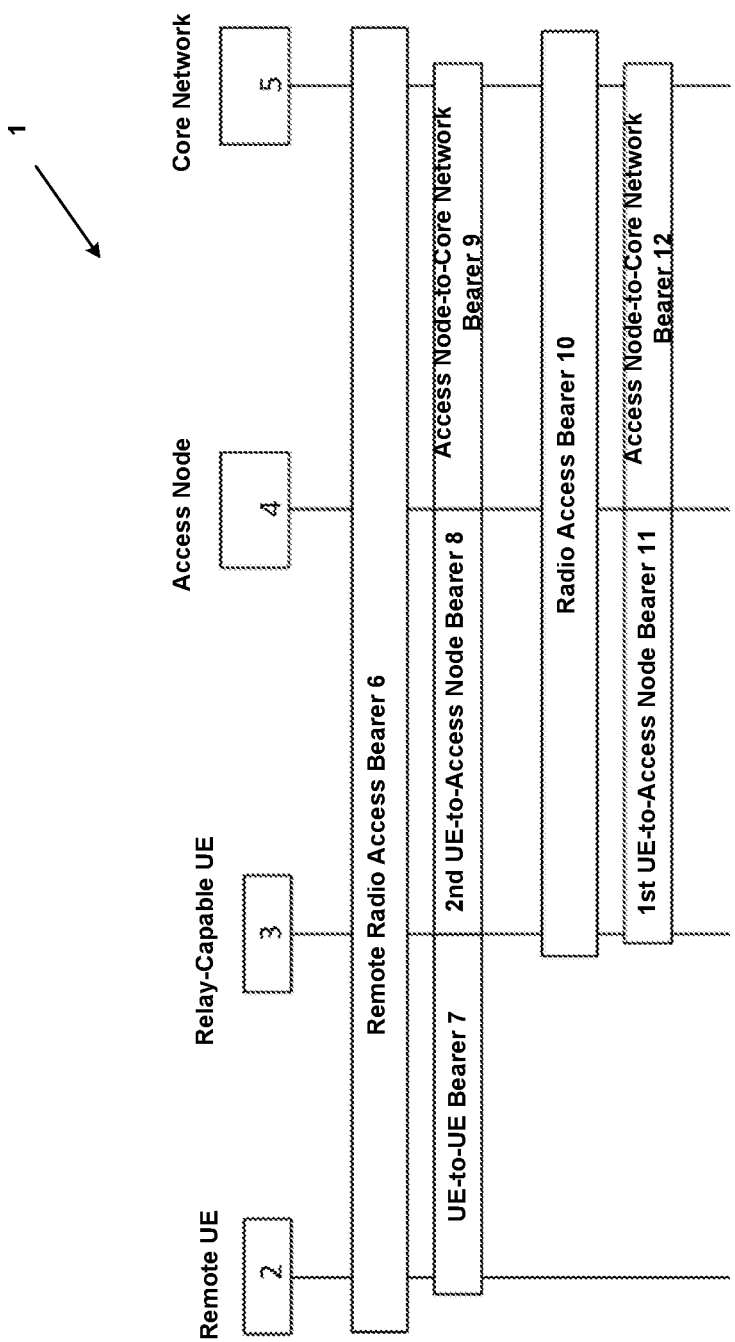
FIG. 1 shows an established Remote Radio Access Bearer between the remote UE and the core network of the telecommunication network.

FIG. 1 shows a schematic illustration 1 of an established Remote Radio Access Bearer 6 between the remote User Equipment, UE, 2 and the core network as indicated with reference numeral 5. In a more specific example, e.g. in an LTE network, the Remote Radio Access Bearer 6 is established between the remote UE 2 and any of a Mobility Management Function, such as a Mobility Management Entity, MME, or a gateway function, such as the serving gateway, SGW.

The core network 5 could be the Evolved Packet Core, EPC. In such a case, the SGW anchors user-plane mobility in a SGW serving area and functions as a termination point of the packet data network interface towards the access network, i.e. the access node 4. The MME is involved in the bearer activation and deactivation process and is responsible for choosing the SGW for the remote UE 2 at the initial attach thereof to the network. Further, the MME is responsible for authenticating the remote UE 2, for example by interacting with the Home Subscriber Server, HSS. The Non Access Stratum, NAS, signalling terminates at the MME and it is also responsible for generation and allocation of temporary identities to UE's.

The schematic illustration 1 of FIG. 1 shows that the Remote Radio Access Bearer 6 is established via the relay capable UE 3 and the access node 4. The access node 4 is, for example, a base station in a cellular network. More specifically, the access node 4 may be an Evolved Node B, eNB in an LTE network or a NodeB in an UMTS network. In case of a centralized Radio Access Network an access node 4 may be a combination of a radio function unit, referred to as Remote Radio Head, and a processor function, referred to as the Base Band Unit. Other splits of functionality of an access node may also be possible.

The Remote Radio Access Bearer 6 is considered a logical bearer established between the remote UE 2 and the core network 5. The Remote Radio Access Bearer 6 actually comprises three separate bearers.

A first of these three bearers is indicated with reference numeral 7. This bearer is a UE-to-UE bearer 7 and is established between the remote UE 2 and the relay capable UE 3. Such a bearer is thus established to support device to device communication, or ProSe communication. In the 3GPP architecture for LTE, the UE-to-UE bearer 7 would be considered to be established over the PC5 interface.

A second of these three bearers is indicated with reference numeral 8 and is referenced to as the second UE-to-access node bearer 8. This bearer may be a radio bearer 8 and is established between the relay capable UE 3 and the access node 4. This radio bearer 8 is intended to carry traffic to, and from, the remote UE 2 only. In the 3GPP architecture for LTE, the UE-to-access node bearer 8 would be considered to be established over the Uu interface.

A third of these three bearers is indicated with reference numeral 9 and is referenced to as an access node-to-core network bearer 9. This bearer is established between the access node 4 and the core network 5. In the 3GPP architecture for LTE, the access node-to-core network bearer 9 would be considered to be established over the S1 interface.

It is noted that for the ProSe communication, two different scenario's may exist, i.e. an "in coverage" scenario and a "partial coverage" scenario. In an "in coverage" scenario, the remote UE 2 as well as the relay capable UE 3 are within coverage range of the access node 4, and the network may control the resources used for ProSe communication.

In a partial coverage situation such a centralized control may not be feasible. That is, the remote UE 2 is not in direct coverage of the access node 4 and the relay capable UE 3 is in direct coverage of the access node 4.

The schematic illustration 1 of FIG. 1 further shows an established Radio Access Bearer 10 between the relay capable UE 3 and the core network 5. This specific Radio Access Bearer 10 is a dedicated bearer for the relay capable UE 3. As such, this bearer is not used for communication to, and from, the remote UE 2. The Radio Access Bearer 10 comprises two separate bearers which are associated to the Radio Access Bearer 10.

The first bearer is referenced to as a first UE-to-access node bearer 11 and is established between the relay capable UE 3 and the access node 4. The second bearer is referenced to as an access node-to-core network bearer 12 and is established between the access node 4 and the core network 5.

It is noted that the solution of introducing a Remote Radio Access Bearer 6 makes the remote UE 2 directly visible to the access network 4 and core network 5, while the remote UE 2 is being relayed via the relay capable UE 3. The relay capable UE 3 will then act as a relay of signalling and user plane traffic between the remote UE 2 and the access node 4.

The Remote Radio Access Bearer 6 represents the connection of the remote UE 2 to the core network 5 and may be used for data transfer. Each of the nodes over which the Remote Radio Access Bearer 6 is established may store information required to forward the traffic in both directions. This type of information may be the bearer or connection identifications used to create associations which a node accesses to find where to forward packets belonging to the Remote Radio Access Bearer 6. These associations may be saved during the establishment of the Remote Radio Access Bearer 6.

Following the above, the access node 4 is thus able to distinguish between traffic with said relay capable UE 3 over said first UE-to-access node bearer 11 and traffic with said remote UE over said second UE-to-access node bearer 8.

Figure 2:
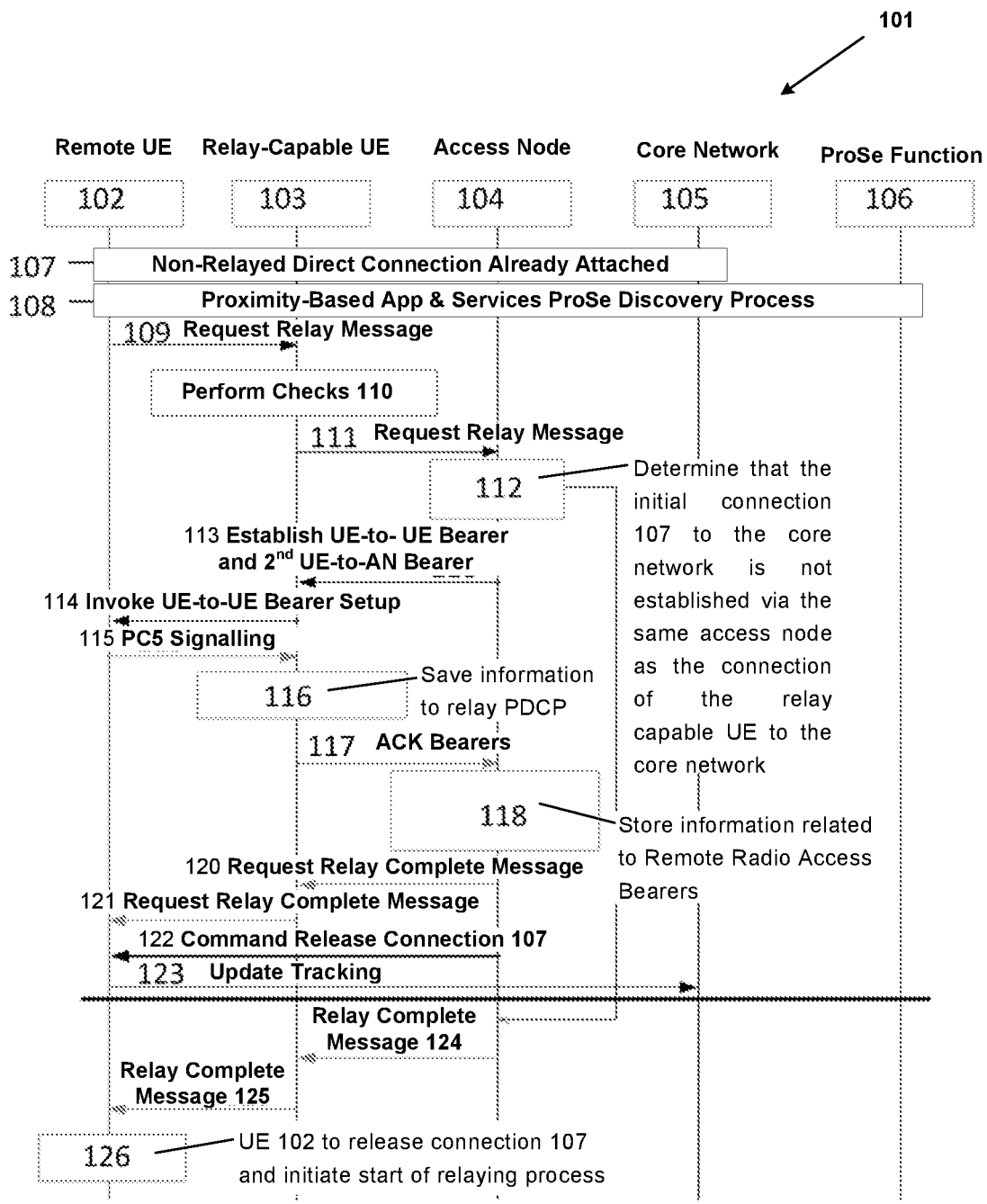
FIG. 2 shows a signalling diagram in which a UE-to-UE bearer as well as a second UE-to-access node bearer is established for a remote UE in connected mode.

FIG. 2 shows a signalling diagram 101 in which a UE-to-UE bearer as well as a second UE-to-access node bearer is established for a remote UE in connected mode.

Here below, an explanation of the signalling diagram 101 is provided with references to the ECM-Connected state as known in the Long Term Evolution, LTE, network. A similar, or the same, state is however also known in other networks, making the signalling diagram 101 also applicable to these types of networks.

In the signalling diagram 101, the remote UE is indicated with reference numeral 102, the relay capable UE is indicated with reference numeral 103, the access node is indicated with reference numeral 104, the core network is indicated with reference numeral 105 and the ProSe Function is indicated with reference numeral 106.

Here, reference numeral 107 indicates that the remote UE 102 has already attached a non-relayed, direct connection to the core network 105. As such, the remote UE 102 is within the coverage area of the access node 104. The remote UE 102 has thus connected to the network in a standard, conventional manner.

The remote UE 102 may decide that it would like a relayed connection towards the network. In order to discover potential UEs that could serve as a relay for the remote UE 102, the remote UE 102 may initiate a proximity-based applications and services, ProSe, discovery process 108.

A ProSe discovery process 108 is a process that identifies a UE that is ProSe-enabled in the proximity of another, using evolved UMTS Terrestrial Radio Access, E-UTRA or the evolved packet core, EPC. The depicted ProSe discovery process 108 may result in the discovery of the relay capable UE 103, i.e. a UE that is capable to act as a relay for the remote UE 102.

Following the discovery of the relay capable UE 103, the remote UE 102 sends 109 a Request Relay message to the discovered relay capable UE 103 via a PC5 connection. The message is a request from the remote UE 102 for using the relay capable UE 103 as a relay to the core network 105. This Request Relay message may include an identifier, for example the temporary Cell Radio Network Temporary Identifier, C-RNTI, for identifying said remote UE 102 at the access node 104. The message may further comprise information with respect to Quality-of-Service, QoS, requirements that the remote UE 102 needs or already has on existing Radio Bearers.

The relay capable UE 103 may perform checks 110, i.e. processing constraints, QoS parameters, allowed UE's to be relayed, etc., whether to authorize the relaying of the remote UE 102. In case of a positive outcome, the relay capable UE 103 sends 111 the Request Relay message towards the access node 104. In another embodiment, the relay capable UE 103 sends 111 the Request Relay message towards the access node 104 without performing checks 110.

The access node 104 will then find, if available, the connection 107 it already has to the remote UE 102 based on the identifier, i.e. the temporary Cell Radio Network Temporary Identifier, present in the Request Relay message. If it is determined 112 that the initial connection 107 of the remote UE 102 to the core network 105 is not established via the same access node 104 as the connection of the relay capable UE 103 to the core network 105, a Request Relay Complete message is sent 124, 125 from the access node 104, via the relay capable UE 103 to the remote UE 102. This message indicates that relay is currently not possible. An alternative to sending the Request Relay Complete message is to perform a handover such that the remote UE is serviced by the same access node as the relay capable UE. The block indicated with reference numeral 126 depicts the situation that the remote UE 102 is to release its connection 107 to the core network 105, and is to initiate the start of the relaying process from the ECM-Idle state as will be elucidated with respect to FIG. 3.

On the determination that the initial connection 107 of the remote UE 102 to the core network 105 is established via the same access node 104 as the connection of the relay capable UE 103 to the core network 105, the access node 104 sends 113 a command for establishing the UE-to-UE bearer and the second UE-to-access node bearer. This command is, for example, coupled to an RRC Radio Bearer Setup procedure message having embedded therein an PC5 bearer setup flag.

The relay capable UE 103 receives the command and uses, for example, PC5 signalling 114 to invoke a UE-to-UE bearer setup between the remote UE 102 and the relay capable UE 103, for example the PC5 bearer setup.

When the relay capable UE 103 has received 115 a confirmation to the PC5 bearer setup from the remote UE 102, and the second UE-to-access node bearer has been established between the relay capable UE 103 and the access node, the relay capable UE 103 may acknowledge 117 the establishment of both bearers to the access node 104. The relay capable UE 103 may further save 116 any information necessary to relay Packet Data Convergence Protocol, PDCP, data between the remote UE 102 and the access node 104.

Once the UE-to-UE bearer has been established and once the second UE-to-access node bearer has been established, the access node 104 may store 118 the information related to the underlying bearers of the Remote Radio Access Bearer, i.e. the established UE-to-UE bearer, the established UE-to-access node bearer and an access node-to-core network bearer. The access node-to-core network bearer may be the same bearer as was previously used for the connection of the remote UE to the network or it may also be a different bearer. Typically, such a bearer is the S1 bearer.

Finally, the access node 104 sends 120 a Request Relay Complete message to the relay capable UE 103, which, in turn, sends 121 this message to the remote UE 102 indicating that the Remote Radio Access Bearer has been established. Further, the access node 104 may send a command 122 to the remote UE 102 to release its initial connection 107 to the core network. Alternatively, the access node 104 could release the connection 107 by itself and acknowledge this to the remote UE. The procedure is then completed by the remote UE 102 updating its tracking area 123 to the core network 105, using a Non Access Stratum, NAS, connection.

Figure 3:
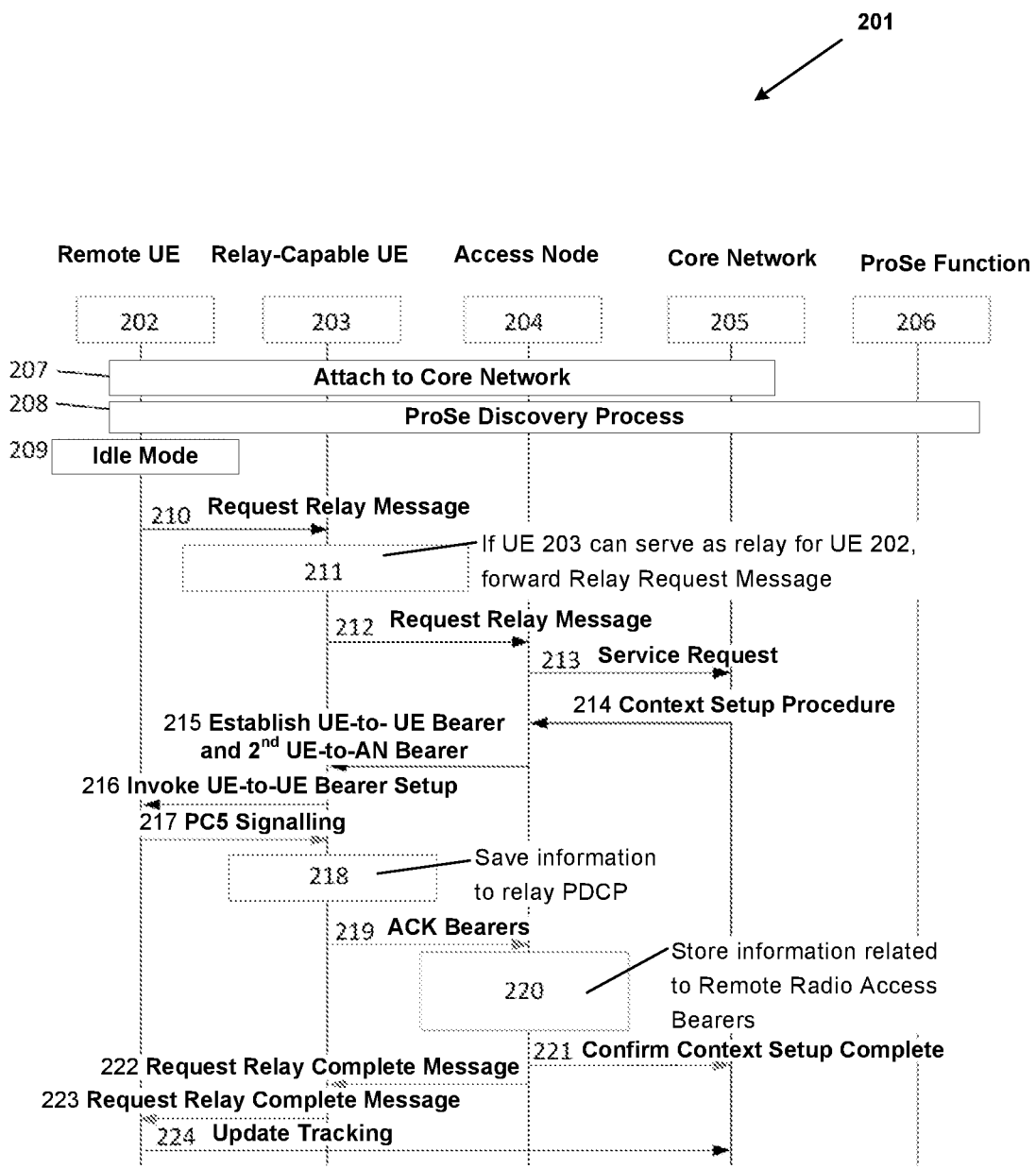
FIG. 3 shows a signalling diagram in which a UE-to-UE bearer as well as a second UE-to-access node bearer is established for a remote UE in idle mode.

FIG. 3 shows a signalling diagram 201 in which a UE-to-UE bearer as well as a second UE-to-access node bearer is established for a remote UE in idle mode. In this respect, the remote UE is indicated with reference numeral 202, the relay capable UE is indicated with reference numeral 203, the access node is indicated with reference numeral 204, the core network is indicated with reference numeral 205 and the ProSe function is indicated with reference numeral 206.

The signalling diagram 201 depicted in FIG. 3 discloses the situation in which the remote UE 202 does not have a Radio Access Bearer established to the core network 205, or in the situation that the remote UE 202 has lost its connection, but is still known in the network. In these kinds of situations, the procedure is supplemented with an additional service request message which will be explained in more detail here below.

In a first step, the remote UE 202 attaches 207 to the core network 205 in a conventional manner. Second, the remote UE 202 performs a ProSe discovery process 208 to determine whether there are UE's in its proximity that could serve as a relay for a connection to the core network 205. These two steps are also explained with reference to FIG. 2 and will not be explained here in more detail.

Different from the scenario in FIG. 2 is that here, the remote UE is in idle mode 209, which is for example indicated with the ECM-IDLE state in a Long Term Evolution, LTE, network.

Again, the remote UE 202 sends 210 a Request Relay message towards the relay capable UE 203 for using the relay capable UE 203 as a relay to the core network 205. Here, the Request Relay message also comprises a Service Request for requesting services from the telecommunication network. The service request may, alternatively, also be sent in a separate message. Such a service request is, for example, an LTE Service Request message directed to the MME.

The relay capable UE 203 then may again perform checks 211 to determine whether it can serve as a relay for the remote UE 202, and, if approved, it forwards 212 the Request Relay message, comprising the service request, to the access node 204. In an alternative embodiment, the relay capable UE 203 sends 212 the Request Relay message towards the access node 204 without performing checks 211.

Upon receipt of the Request Relay message, the access node 204 forwards 213 the service request to the core network 205, and receives 214 a context setup procedure from the core network 205, for example from the Mobility Management Entity.

Most of the remainder steps depicted in FIG. 3 are the same, or similar to the steps depicted in FIG. 2 and are therefore not explained in detail. That is, step 215 corresponds to step 113, step 216 corresponds to step 114, step 217 corresponds to step 115, step 218 corresponds to step 116, step 219 corresponds to step 117, step 220 corresponds to 118, step 222 corresponds to step 120, step 223 corresponds to step 121 and step 224 corresponds to step 123. In addition to the above, the access node 204 confirms 221 to the core network 205 that the context setup procedure is completed.

Figure 4:
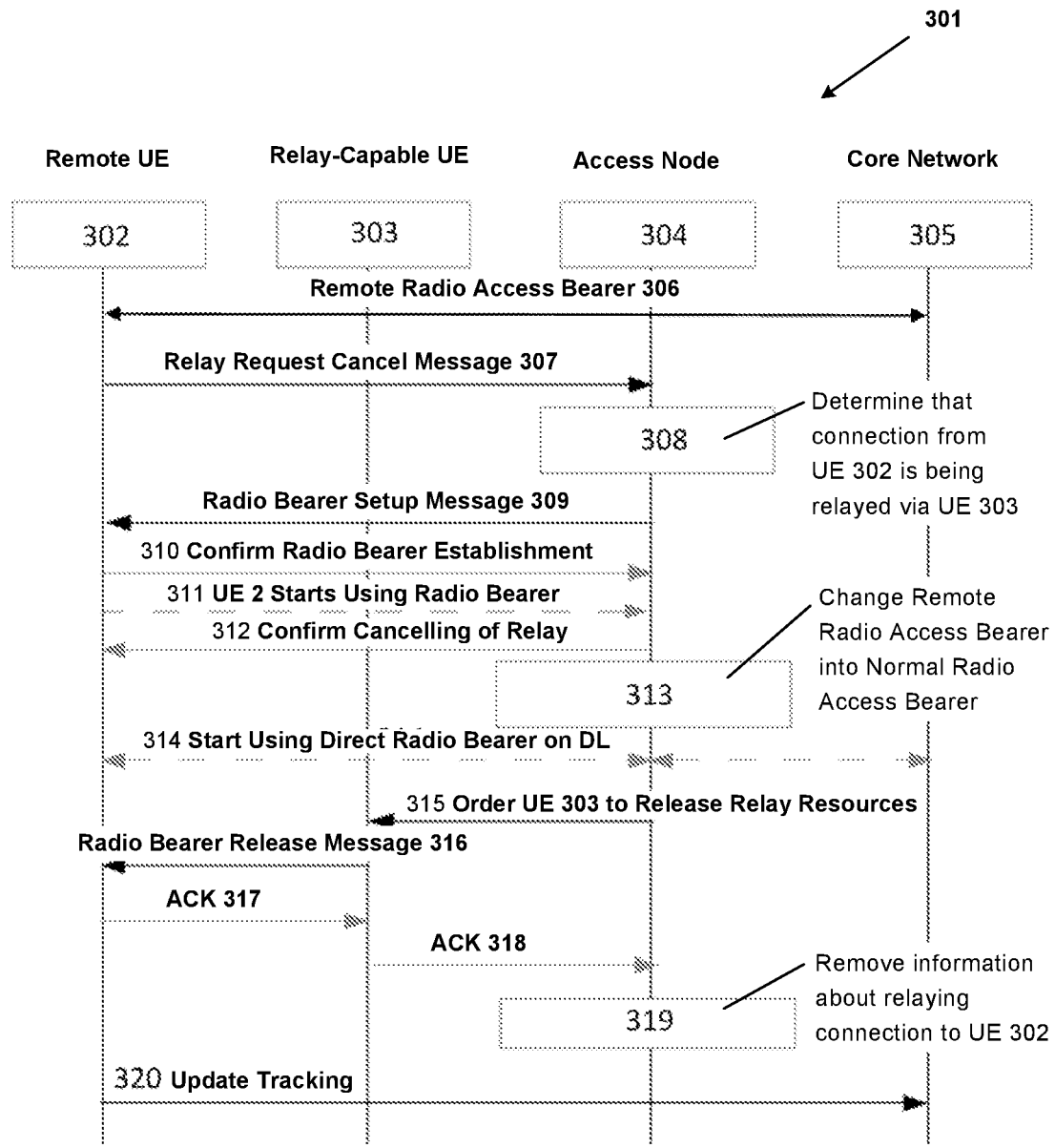
FIG. 4 shows a signalling diagram in which the relaying for the remote UE is stopped.

FIG. 4 shows a signalling diagram 301 in which the relaying for the remote UE is stopped.

Here, the remote UE is indicated with reference numeral 302, the relay capable UE is indicated with reference numeral 303, the access node is indicated with reference numeral 304 and the core network is indicated with reference numeral 305.

In this situation a Remote Radio Access Bearer 306 is established between the remote UE 302 and the core network 305 via the relay capable UE 303 and the access node 304.

The remote UE 302 decides to cancel the relaying of traffic via the relay capable UE 303 (e.g. because the remote UE 302 notices that the connection with the relay capable UE 303 is deteriorating) and sends 307 a Request Relay Cancel message to the access node 304 via, for example, Access Stratum signalling.

The access node 304 is able to determine 308 that the connection from the remote UE 302 is being relayed via the relay capable UE 303 using an identification of the remote UE 302 or a direct identification of the UE-to-UE bearer established between the remote UE 302 and the relay capable UE 303. Alternatively, the Request Relay Cancel message sent 307 comprises an identification of the Remote Radio Access Bearer for which relaying needs to be cancelled. In this case, the access node 304 may have the context information stored to determine that this particular Radio Access Bearer is in fact a Remote Radio Access Bearer. A Radio Bearer Setup message is then sent 309 by the access node 304 to the remote UE 302 to initiate the establishment of a radio bearer directly between the remote UE 302 and the access node 304. This new radio bearer is not to be established via the relay capable UE 303.

The remote UE 302 then confirms 310 the establishment of the Radio Bearer, and the remote UE 302 starts using 311 the bearer for, for example, uplink data. Then, the access node 304 confirms 312 cancelling of the relay, changes 313 the specific Remote Radio Access Bearer into a normal Radio Access Bearer 306 and starts using 314 the direct radio bearer to the remote UE 302 for downlink traffic.

Upon completion of the relay cancelling, the access node 304 orders the relay capable UE 303 to release all relay resources by sending 315, 316 a Radio Bearer Release message comprising a UE-to-UE bearer release Flag. This triggers the release procedure to the remote UE 302, and is acknowledged, by the remote UE 302, in an acknowledgement message 317, 318 towards the access node 304.

If in an alternative case the UE-to-UE connection is broken, a timeout mechanism may be used to release the resources in the remote UE.

Finally, the access node removes 319 all information with respect to the relaying connection of the remote UE 302 to the core network 304 and the remote UE 302 updates 320 its tracking area to the core network 304.

Figure 5:
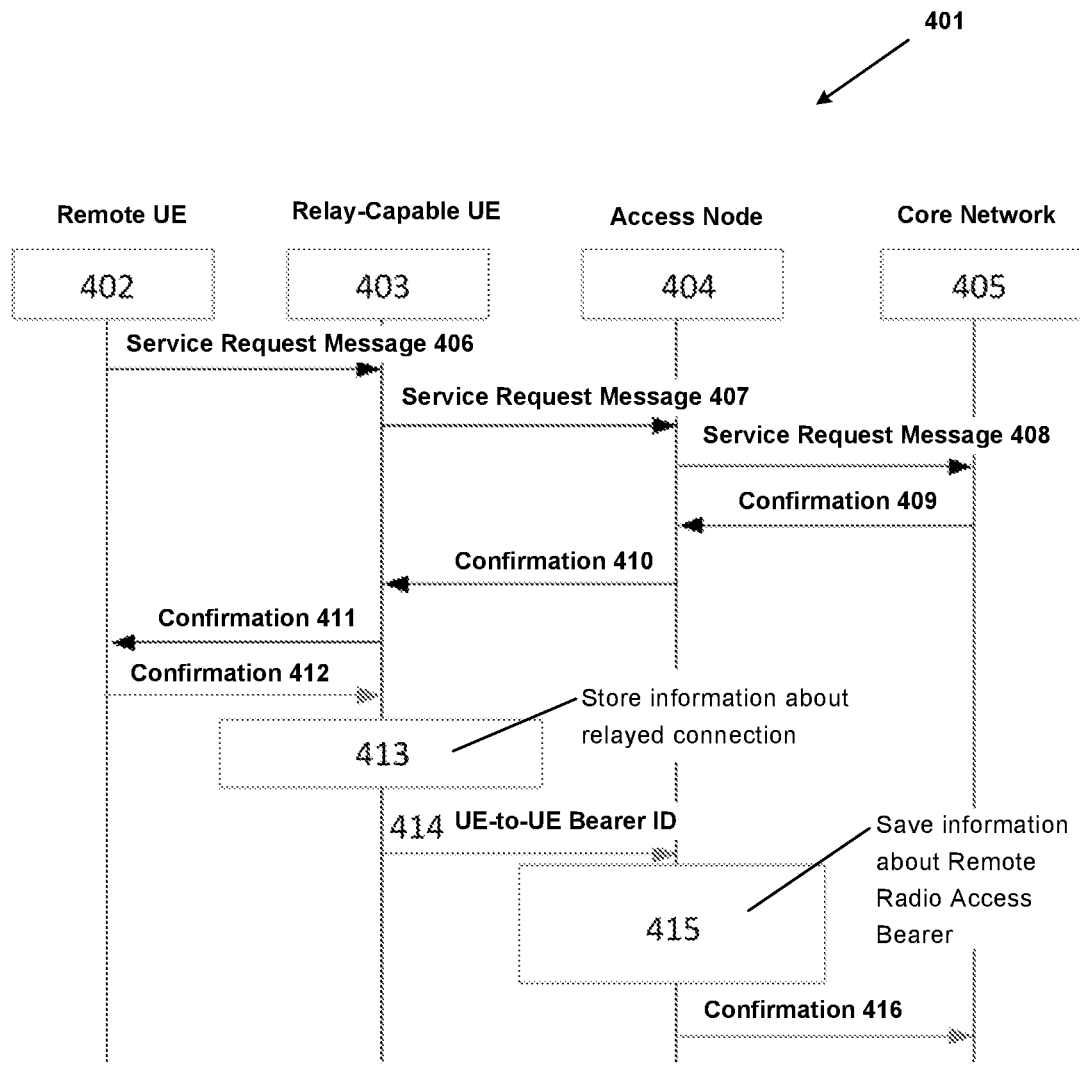
FIG. 5 shows a signalling diagram in which the remote UE switches from an idle mode to a connected mode during relaying by the relay capable UE.

FIG. 5 shows a signalling diagram 401 in which the remote UE switches from an idle mode to a connected mode during relaying by the relay capable UE.

Here, the remote UE is indicated with reference numeral 402, the relay capable UE is indicated with reference numeral 403, the access node is indicated with reference numeral 404 and the core network is indicated with reference numeral 405.

In this situation, the remote UE 402 may use the relay capable UE 403 as a relay and its connectivity states are the same as when its connection to the network is direct, i.e. not relayed. Moving from an idle state to a connected state may then be performed as shown in FIG. 5. That is, a service request message, for example an NAS service request message, is sent 406 over the UE-to-UE signalling connection to the relay capable UE 403, which relay capable UE 403, in turn, forwards 407 that request to the access node 404, which access node 404, in turn, forwards 408 the request to the core network 405.

A confirmation is sent 409, 410, 411 by the core network 405 and is forwarded by each of the intermediate nodes 404, 403 to the remote UE 402, wherein the confirmation comprises an UE-to-UE bearer setup flag for indicating that the UE-to-UE bearer should be established.

The remote UE 402 then sends 412 a confirmation to the relay capable UE 403 that the UE-to-UE bearer is established, and the relay capable UE 403 stores 413 any information related to the relayed connection. An identification of the UE-to-UE bearer is then sent 414 to the access node, and the access node saves 415 any information, i.e. information related to the Remote Radio Access Bearer, with respect to the remote UE 402 as a relayed connection from the remote UE 402 to the core network 405 via the relay capable UE 403. Finally, a confirmation is sent 416 to the core network for indicating that the bearers have been established.

Figure 6:
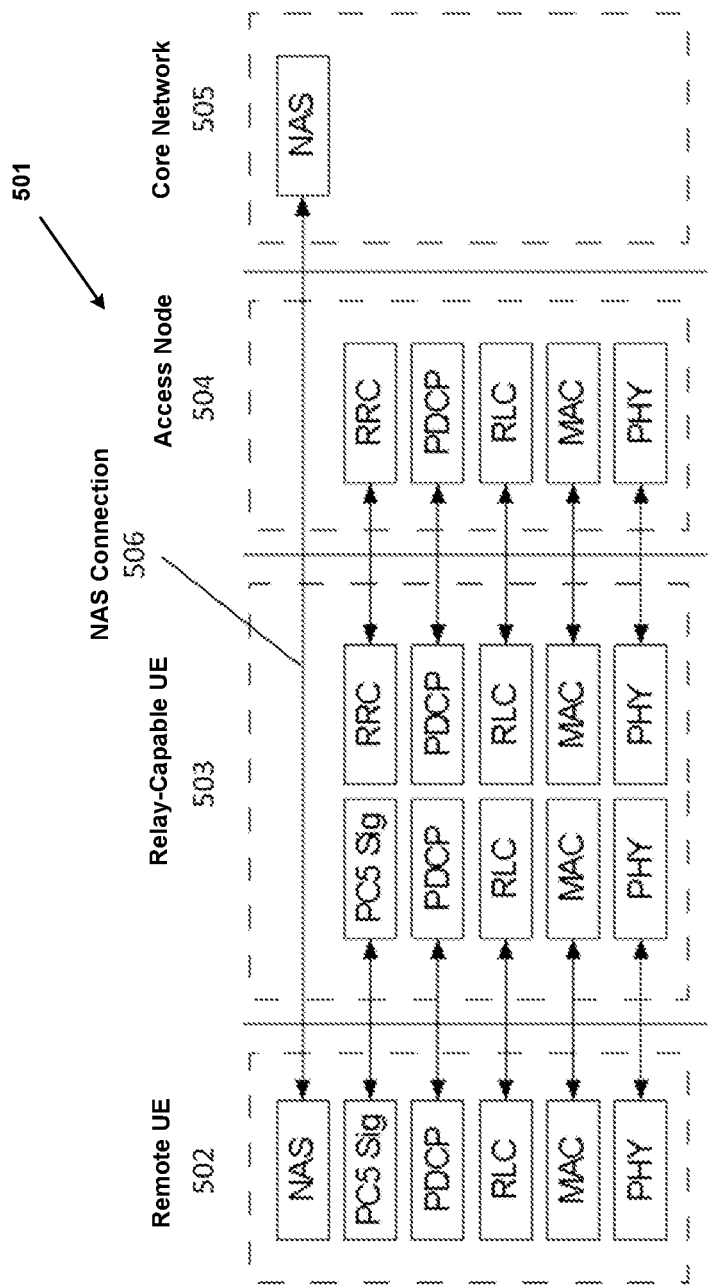
FIG. 6 shows an example of a control plane stack between the remote UE, the relay capable UE, the access node as well as the core network.

FIG. 6 shows an example of a control plane stack 501 between the remote UE, the relay capable UE, the access node as well as the core network.

Here, the remote UE is indicated with reference numeral 502, the relay capable UE is indicated with reference numeral 503, the access node is indicated with reference numeral 504 and the core network, more specifically the MME, is indicated with reference numeral 505.

In this respect it is noted that the remote UE 502 is arranged for establishing a connection between a remote UE and a telecommunication network via the relay capable UE 503. The remote UE comprises a transmitter arranged for sending to the relay capable UE 503, a Request Relay message, wherein the Request Relay message comprises a request for using the relay capable UE 503 as a relay to the core network.

The request is associated with establishment of a Remote Radio Access Bearer, wherein said Remote Radio Access Bearer comprises a UE-to-UE bearer between said remote UE and said relay capable UE, a second UE-to-access node bearer between said relay capable UE and said access node, wherein said second UE-to-access node bearer is different from said first UE-to-access node bearer, and an access node-to-core network bearer between said access node and said core network.

The remote UE 502 further comprises a processor arranged for establishing said UE-to-UE signalling connection, and for establishing a Non-Access Stratum, NAS, connection 506 between said remote UE and said core network over said established UE-to-UE signalling connection. Preferably, the NAS connection 506 is established over the PC5 signalling connection.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The invention claimed is:

1. A method of establishing a connection between a remote User Equipment (UE) and a telecommunication network via a relay capable UE, wherein the telecommunication network comprises a core network and an access network, and the access network comprises an access node, the method comprising:
receiving, from the remote UE, a request associated with establishment of a Remote Radio Access Bearer between the remote UE and the core network, the Remote Radio Access Bearer being a logical bearer and making the remote UE directly visible to the core network;
sending the request to the access node; and
establishing (i) a UE-to-UE bearer between the remote UE and the relay capable UE and (ii) a second UE-to-access node bearer between the relay capable UE and the access node for communication between the remote UE and the telecommunication network, the second UE-to-access node bearer being different from a first UE-to-access node bearer between the relay capable UE and the access node for communication between the relay capable UE and the telecommunication network,
wherein the Remote Radio Access Bearer comprises the UE-to-UE bearer between the remote UE and the relay capable UE and the second UE-to-access node bearer between the relay capable UE and the access node.

2. The method according to claim 1, further comprising establishing a corresponding UE-to-UE connection.

3. The method according to claim 2, further comprising transporting Non-Access Stratum (NAS) signaling between the remote UE and the core network over the UE-to-UE connection.

4. A method of establishing a connection between a remote User Equipment (UE) and a telecommunication network via a relay capable UE, wherein the telecommunication network comprises a core network and an access network, and the access network comprises an access node, the method comprising:
sending, to the relay capable UE, a request associated with establishment of a Remote Radio Access Bearer between the remote UE and the core network, the Remote Radio Access Bearer being a logical bearer and making the remote UE directly visible to the core network;
establishing a UE-to-UE bearer between the remote UE and the relay capable UE; and
causing a second UE-to-access node bearer to be established between the relay capable UE and the access node for communication between the remote UE and the telecommunication network, the second UE-to-access node bearer being different from a first UE-to-access node bearer between the relay capable UE and the access node for communication between the relay capable UE and the telecommunication network,
wherein the Remote Radio Access Bearer comprises the UE-to-UE bearer between the remote UE and the relay capable UE and the second UE-to-access node bearer between the relay capable UE and the access node.

5. The method according to claim 4, further comprising establishing a corresponding UE-to-UE connection.

6. The method according to claim 5, further comprising sending Non-Access Stratum (NAS) signaling between the remote UE and the core network over the UE-to-UE connection.

7. The method according to claim 4, further comprising:
receiving a command for releasing a direct, non-relayed connection between the remote UE and the telecommunication network via the access node; and
releasing the direct, non-relayed connection in response to the received command.

8. The method according to claim 4, further comprising:
performing a discovery process for discovering UE's in a proximity of the remote UE, wherein the relay capable UE is one of the discovered UE's.

9. A method of establishing a Non-Access Stratum (NAS) signaling connection between a remote User Equipment (UE) and a telecommunication network via a relay capable UE, wherein the telecommunication network comprises a core network and an access network, and the access network comprises an access node, the method comprising:
receiving, in the core network, a request, originated from the remote UE, associated with establishment of a Remote Radio Access Bearer between the remote UE and the core network, the Remote Radio Access Bearer being a logical bearer and making the remote UE directly visible to the core network,
wherein the Remote Radio Access Bearer comprises a UE-to-UE bearer between the remote UE and the relay capable UE and a second UE-to-access node bearer between the relay capable UE and the access node, the second UE-to-access node bearer being different from a first UE-to-access node bearer between the relay capable UE and the access node for communication between the relay capable UE and the telecommunication network; and
establishing the NAS signaling connection between the remote UE and the core network via the relay UE, and by way of the UE-to-UE bearer and second UE-to-access node bearer.

10. A non-transitory computer-readable storage medium having instructions stored thereon for establishing a connection between a remote User Equipment (UE) and a telecommunication network via a relay capable UE, wherein the telecommunication network comprises a core network and an access network, and the access network comprises an access node, wherein the instructions, when executed by one or more processors, cause the one or more processors to carry out operations including:
receiving, from the remote UE, a request associated with establishment of a Remote Radio Access Bearer between the remote UE and the core network, the Remote Radio Access Bearer being a logical bearer and making the remote UE directly visible to the core network,
sending the request to the access node; and
establishing (i) a UE-to-UE bearer between the remote UE and the relay capable UE and (ii) a second UE-to-access node bearer between the relay capable UE and the access node for communication between the remote UE and the telecommunication network, the second UE-to-access node bearer being different from a first UE-to-access node bearer between the relay capable UE and the access node for communication between the relay capable UE and the telecommunication network,
wherein the Remote Radio Access Bearer comprises the UE-to-UE bearer between the remote UE and the relay capable UE and the second UE-to-access node bearer between the relay capable UE and the access node.

11. A non-transitory computer-readable storage medium having instructions stored thereon for establishing a connection between a remote User Equipment (UE) and a telecommunication network via a relay capable UE, wherein the telecommunication network comprises a core network and an access network, and the access network comprises an access node, wherein the instructions, when executed by one or more processors, cause the one or more processors to carry out operations including:
sending, to the relay capable UE, a request associated with establishment of a Remote Radio Access Bearer between the remote UE and the core network, the Remote Radio Access Bearer being a logical bearer and making the remote UE directly visible to the core network;
establishing a UE-to-UE bearer between the remote UE and the relay capable UE; and
causing a second UE-to-access node bearer to be established between the relay capable UE and the access node for communication between the remote UE and the telecommunication network, the second UE-to-access node bearer being different from a first UE-to-access node bearer between the relay capable UE and the access node for communication between the relay capable UE and the telecommunication network,
wherein the Remote Radio Access Bearer comprises the UE-to-UE bearer between the remote UE and the relay capable UE and the second UE-to-access node bearer between the relay capable UE and the access node.

12. A non-transitory computer-readable storage medium having instructions stored thereon for establishing a connection between a remote User Equipment (UE) and a telecommunication network via a relay capable UE, wherein the telecommunication network comprises a core network and an access network, and the access network comprises an access node, wherein the instructions, when executed by one or more processors, cause the one or more processors to carry out operations including:
receiving, in the core network, a request, originated from the remote UE, associated with establishment of a Remote Radio Access Bearer between the remote UE and the core network, the Remote Radio Access Bearer being a logical bearer and making the remote UE directly visible to the core network,
wherein the Remote Radio Access Bearer comprises a UE-to-UE bearer between the remote UE and the relay capable UE and a second UE-to-access node bearer between the relay capable UE and the access node, the second UE-to-access node bearer being different from a first UE-to-access node bearer between the relay capable UE and the access node for communication between the relay capable UE and the telecommunication network; and;
establishing a NAS signaling connection between the remote UE and the core network via the relay UE, and by way of the UE-to-UE bearer and second UE-to-access node bearer.

13. A relay capable User Equipment (UE) arranged for establishing a connection between a remote UE and a telecommunication network via the relay capable UE, wherein the telecommunication network comprises a core network and an access network, and the access network comprises an access node, the relay capable UE comprising:
a receiver arranged for receiving, from the remote UE, a request associated with establishment of a Remote Radio Access Bearer between the remote UE and the core network, the Remote Radio Access Bearer being a logical bearer and making the remote UE directly visible to the core network, a transmitter arranged for sending the request to the access node; and a processor arranged for establishing (i) a UE-to-UE bearer between the remote UE and the relay capable UE and (ii) a second UE-to-access node bearer between the relay capable UE and the access node for communication between the remote UE and the telecommunication network, the second UE-to-access node bearer being different from a first UE-to-access node bearer between the relay capable UE and the access node for communication between the relay capable UE and the telecommunication network, wherein the Remote Radio Access Bearer comprises the UE-to-UE bearer between the remote UE and the relay capable UE and the second UE-to-access node bearer between the relay capable UE and the access node.

14. The relay capable UE according to claim 13, wherein the processor is further arranged for establishing a corresponding UE-to-UE connection.

15. The relay capable UE according to claim 14, wherein the processor is further configured for transporting Non-Access Stratum (NAS) signaling between the remote UE and the core network over the UE-to-UE connection.

16. A remote User Equipment (UE) arranged for establishing a connection between a remote UE and a telecommunication network via a relay capable UE, wherein the telecommunication network comprises a core network and an access network, and the access network comprises an access node, the remote UE comprising:

a transmitter arranged for sending, to the relay capable UE, a request associated with establishment of a Remote Radio Access Bearer between the remote UE and the core network, the Remote Radio Access Bearer being a logical bearer and making the remote UE directly visible to the core network; and a processor arranged for:

establishing a UE-to-UE bearer between the remote UE and the relay capable UE; and causing a second UE-to-access node bearer to be established between the relay capable UE and the access node for communication between the remote UE and the telecommunication network, the second UE-to-access node bearer being different from a first UE-to-access node bearer between the relay capable UE and the access node for communication between the relay capable UE and the telecommunication network, wherein the Remote Radio Access Bearer comprises the UE-to-UE bearer between the remote UE and the relay capable UE and the second UE-to-access node bearer between the relay capable UE and the access node.

17. The remote UE according to claim 16, wherein the processor is further arranged for establishing a corresponding UE-to-UE connection.

18. The remote UE according to claim 17, wherein the processor is further configured for sending Non-Access Stratum (NAS) signaling between the remote UE and the core network over the UE-to-UE connection.

19. A core network node, arranged for establishing a Non-Access Stratum (NAS) signaling connection between a remote User Equipment (UE) and a telecommunication network via a relay capable UE, wherein the telecommunication network comprises a core network and an access network, and the access network comprises an access node, the core network node comprising:

a receiver arranged for receiving a request, originated from the remote UE, associated with establishment of a Remote Radio Access Bearer between the remote UE and the core network, the Remote Radio Access Bearer being a logical bearer and making the remote UE directly visible to the core network, wherein the Remote Radio Access Bearer comprises a UE-to-UE bearer between the remote UE and the relay capable UE and a second UE-to-access node bearer between the relay capable UE and the access node, the second UE-to-access node bearer being different from a first UE-to-access node bearer between the relay capable UE and the access node for communication between the relay capable UE and the telecommunication network; and a processor arranged for establishing the NAS signaling connection between the remote UE and the core network via the relay UE, and by way of the UE-to-UE bearer and second UE-to-access node bearer.

\* \* \* \* \*